United States Patent
Malhotra et al.

[19]

[11] Patent Number: 6,108,801
[45] Date of Patent: Aug. 22, 2000

[54] USING PROFILES TO PERFORM BIT ERROR RATE TESTING

[75] Inventors: Pankaj Malhotra, Sunnyvale; Michael Segal, Cupertino, both of Calif.

[73] Assignee: Cisco Systems, Inc., San Jose, Calif.

[21] Appl. No.: 09/132,567

[22] Filed: Aug. 11, 1998

[51] Int. Cl.$^7$ ...................................................... G06F 11/00
[52] U.S. Cl. ........................... 714/704; 714/712; 714/715
[58] Field of Search .................................. 714/704, 703, 714/712, 715, 738; 379/21

[56] References Cited

U.S. PATENT DOCUMENTS 3,956,601  5/1976  Harris et al. ............................... 379/21

Primary Examiner—Phung M. Chung
Attorney, Agent, or Firm—Law Office of Imam

[57] ABSTRACT

A digital system for Bit Error Rate Testing (BERT) of test transmission lines and/or devices and including a test equipment coupled to at least one transmission line for transferring digital information between the test equipment and a company office, a bit error generator coupled to the transmission lines for generating test patterns, a device for storing a plurality of predetermined profiles, each profile having associated therewith at least one parameter for measuring the integrity of the test equipment or the transmission lines, the parameters including one of the generated test patterns. The predetermined profiles are automatically sent through the test equipment and the transmission lines in a predetermined order thereby avoiding user interaction, the test equipment receives information responsive to the profiles sent through the transmission line, wherein the received information is verified against the information included in the profiles for determining the integrity of the test equipment or the transmission lines.

12 Claims, 3 Drawing Sheets

PSEUDORANDOM PATTERN GENERATION

| PATTERN TYPE | |
|---|---|
| $2^3-1$ | |
| $2^4-1$ | |
| $2^5-1$ | |
| $2^6-1$ | |
| $2^7-1$ | |
| $2^7-1$ | Fractional T1 LB Activate |
| $2^7-1$ | Fractional T1 LB Deactivate |
| $2^9-1$ | 0.153 (511 type) |
| $2^{10}-1$ | |
| $2^{11}-1$ | 0.152 and 0.153 (2047 type) |
| $2^{15}-1$ | 0.151 |
| $2^{17}-1$ | |
| $2^{18}-1$ | |
| $2^{20}-1$ | 0.153 |
| $2^{20}-1$ | 0.151 QRSS (PCR. 6=1) |
| $2^{21}-1$ | |
| $2^{22}-1$ | |
| $2^{23}-1$ | 0.151 |
| $2^{25}-1$ | |
| $2^{28}-1$ | |
| $2^{29}-1$ | |
| $2^{31}-1$ | |
| $2^{32}-1$ | (see note below) |

FIG. 3

REPETITIVE PATTERN GENERATION

| PATTERN TYPE |
|---|
| all ones |
| all zeros |
| alternating ones and zeros |
| double alternating ones and zeros |
| 3 in 24 |
| 1 in 16 |
| 1 in 8 |
| 1 in 4 |
| D4 Line Loopback Activate |
| D4 Line Loopback Deactivate |

FIG. 4

USING PROFILES TO PERFORM BIT ERROR RATE TESTING

BACKGROUND OF THE INVENTION

1. Field of the Invention

The present invention relates to the field of automation of Bit Error Rate Testing for digital equipment and transmission lines undergoing testing. In particular, the present invention relates to the automatic generation of profiles, which include test parameters, used in such testing.

2. Description of the Prior Art

Internet Service Providers, ISPs, that deploy Points of Presence, POPs, use what are commonly-known in the industry as T1/E1 transmission lines to interconnect to Central Office (CO) exchange units. Since a significant portion of ISP's customers is large enterprises and financial institutions, ultrahigh availability of services becomes a crucial component in the selection of the ISP. The demarcation point between the local carrier and the ISP is usually the T1/E1 jack, at the ISP premises. If during POP failure, the ISP suspects the T1/E1 links provided by the local carrier are faulty, the problem is escalated to the local carrier who uses his own equipment to test the lines.

Obviously, if the local carrier does not detect the problem, the ISP will have to dispatch a technician with special test equipment to the POP site to isolate the problem. To reduce expenses, large ISPs manage multiple POPs dispersed over a large geographical area, from a single Network Operating Center (NOC). Therefore, sending a technician to a remote location, might be time consuming, which is unacceptable for some of the customers who require ultrahigh network availability, while keeping a technician with test equipment at each POP, might incur prohibitive costs. ISPs therefore seek a user-friendly interface to conduct a comprehensive test of the T1/E1 lines from a remote location (usually NOC).

Loopback and BERT are used by carriers and ISPs to aid in problem resolution as well as testing of the quality of transmission links.

Bit Error Rate Testing (BERT) has been used in the industry for testing of various equipments used for digital communications. For example, switches and routers, which are devices that select the path over which a given piece of data will travel to its destination, interface with transmission lines carrying channels of digital information. Testing of these devices, as well as the integrity of the transmission lines is an important task in ensuring successful transfer of information from its source to its destination. Being that an equipment (or device) such as a router interfaces to multiple transmission lines, it is pertinent to test the quality of each of such lines. Furthermore, there are various different types of tests employed for testing various aspects of each line. Each type of test includes various parameters, such as the bit test pattern, the length of the test and so forth. There can be as many as 20 different test parameters associated with each line.

Currently, in prior art techniques employing BERT, in order to run BERT for each line, the user has to run the test pattern that is assigned to that line and wait for the test to be completed prior to beginning the next test. The next test that is run may be with a different test pattern and/or for a different line. Once the number of tests for a transmission line undergoing testing is completed, the user can then begin testing the next line. This can be a very time-consuming process requiring considerable user interaction since the user must enter all of the parameters every time a test is run on a particular line.

There is therefore a need to automate the process of BERT such as to minimize any user interaction and to decrease the time associated with running BERT thereby increasing system efficiency.

SUMMARY OF THE INVENTION

Briefly, a digital system for performing Bit Error Rate Testing (BERT) includes a test equipment coupled to at least one transmission line for transferring digital information between the test equipment and a company office, a bit error generator coupled to the transmission lines for generating test patterns, a device for storing a plurality of predetermined profiles, each profile having associated therewith at least one parameter for measuring the integrity of the test equipment or the transmission lines, the parameters including one of the generated test patterns. The predetermined profiles may be automatically downloaded for use in testing without user interaction, the test equipment receives information responsive to the profiles sent through the transmission line, wherein the received information is verified against the information included in the profiles for determining the integrity of the test equipment or the transmission lines.

The foregoing and other objects, features and advantages of the invention will no doubt become apparent after reading the following detailed description of the preferred embodiments, which is illustrated in the several figures of the drawing.

IN THE DRAWINGS

FIG. 3 shows a chart including the lengths of various pseudorandom error pattern generators.

FIG. 4 presents a chart of various test pattern types used as parameters in profiles for running BERT.

DETAILED DESCRIPTION OF THE PREFERRED EMBODIMENTS

Figure 1:
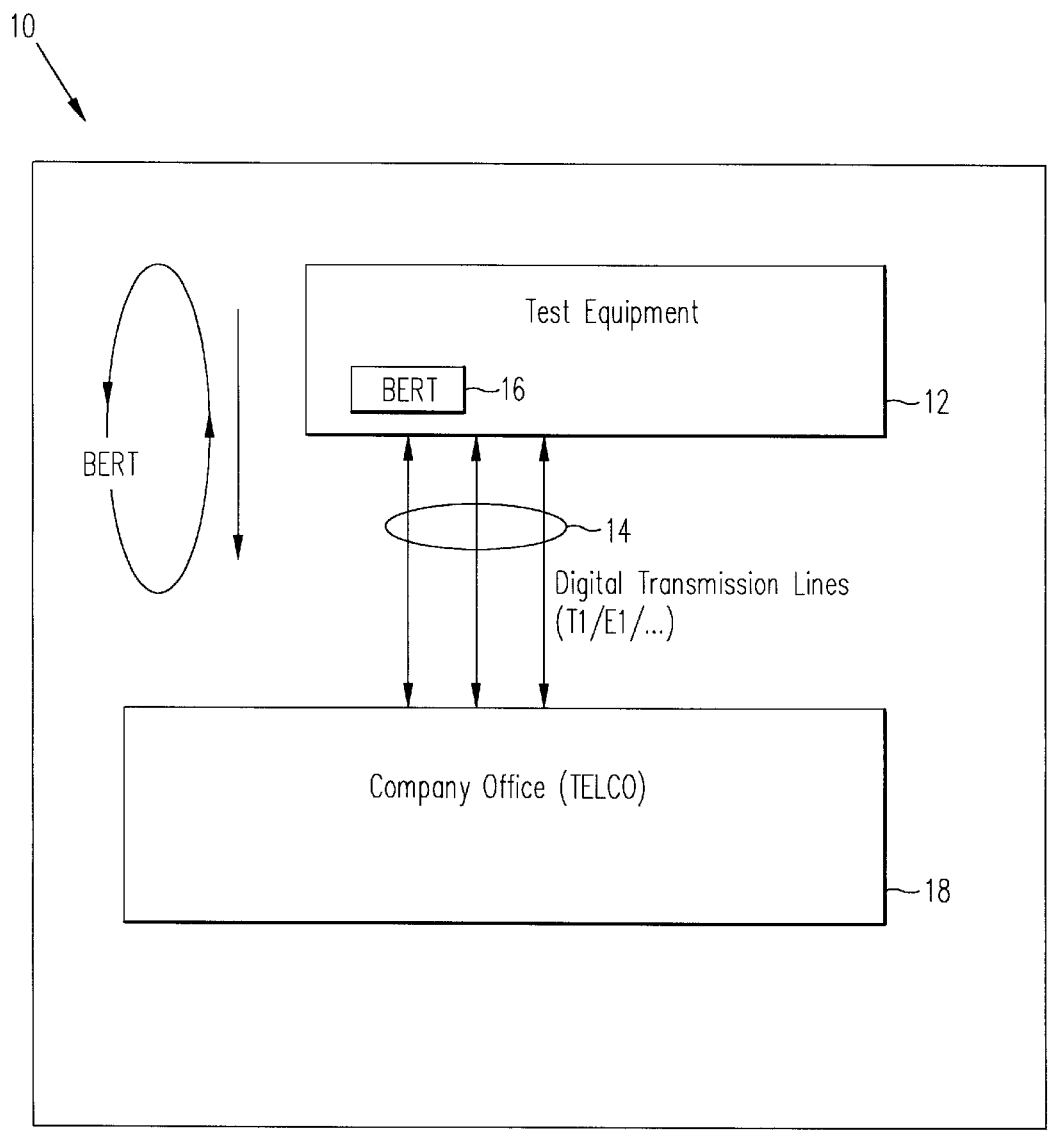
FIG. 1 shows a preferred embodiment of the present invention using BERT for testing of equipment and/or transmission lines.

Referring now to FIG. 1, a digital test system 10 is shown to include a test equipment 12 coupled to a company office (such as the telephone company switch, telco) 18 through a plurality of digital transmission lines 14. The digital test system 10 may be employed by Internet Service Providers (ISPs) that deploy Points of Presences (POPs) and use transmission lines (or links) to interconnect to the Company Office (CO).

The transmission lines may be, what are commonly referred to in the industry as T1 or E1 types of communication lines. For example, a T1 type of communication line carries 24 channels of digital information and an E1 transmission line carries 30 channels of information.

The test equipment 12 includes a Bit Error Rate Testing (BERT) pattern generator 16 for generating a pseudo-random or repetitive test pattern used to test the quality of a transmission line as will be further explained below.

The transmission lines 14 transmit information from the company office 18 to the test equipment 12. The test equipment may be any functional apparatus undergoing testing. In the preferred embodiment of FIG. 1, the test equipment 12 is a Cisco router and/or bridge equipment.

The BERT pattern generator 16 provides a pseudorandom or repetitive test pattern that is sent through one or more of the plurality of transmission lines 14 to telco 18. The test pattern is received by the test equipment 12 from telco 18 and compared to the test pattern that was originally sent. If the test pattern that is received by test equipment 12 matches the original test pattern, the transmission lines 14 are declared functional. In the present invention, any equipment and/or data path therethrough may be similarly tested using the test pattern.

Figure 2:
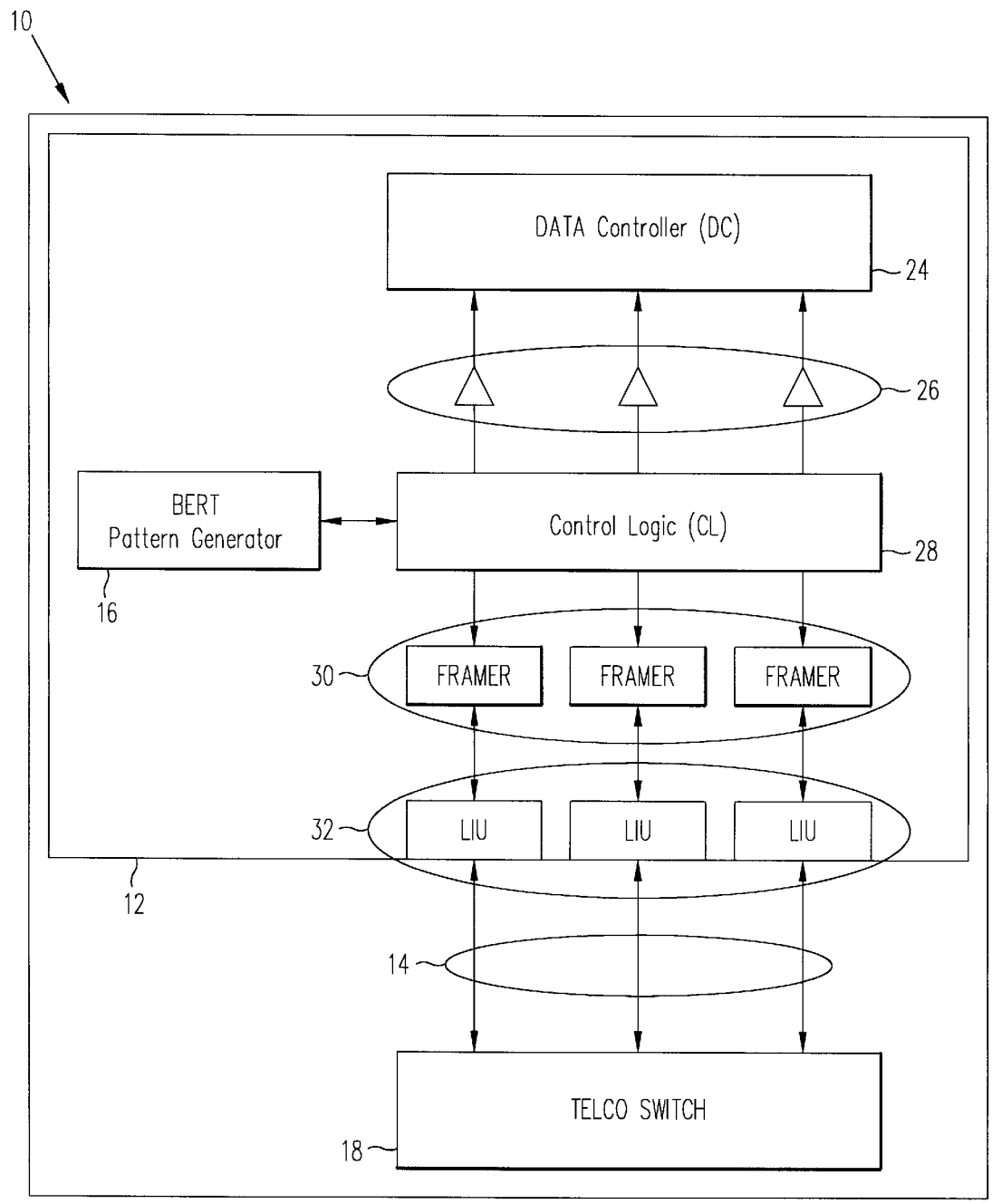
FIG. 2 illustrates greater details of the equipment shown in FIG. 1 that is undergoing testing.

In FIG. 2, the test equipment 12 is shown in greater detail to include the BERT pattern generator 16, a Data Controller (DC) block 24, a control logic block 28, a plurality of tristate buffers 26 and a plurality of Line Interface Units (LIU) blocks 30.

The BERT pattern generator 16 is coupled to the control logic block 28 for providing a test pattern thereto. The control logic block 28 is coupled, through the plurality of tristate buffers 26, to the DC controller block 24. The control logic block 28 is further coupled to the LIU blocks 30.

The LIU blocks along with a framer 30 transmit and receive digital information in the form of T1 or E1 format, through the transmission lines 14, from telco switch 18. During normal operation of the system 10 and upon receipt of information from the telco switch, the DC controller block 24, under the direction of the control logic block 28, processes the incoming frames and transmits the arranged data to various other apparatus (not shown) for further processing. During transmission of information, the DC controller block 24, processes information from other apparatus (not shown), and then attempts to transmit out the data through tristate buffers 26 for transmission thereof through the framer block 30, the LIU blocks 32 and the transmission lines 14 to the telco switch 18. During testing however, the DC controller block 24 is effectively disconnected from the operation of the remainder of the system through the use of the tristate buffers 26, which are programmed by the control logic block 28. That is, the control logic block 28 activates the tristate buffers 26 to remove the function of the DC controller block 24 from the remainder of the system. This isolates the DC controller block 24 and prevents the same from affecting testing of the system.

The test path, as will be further discussed below, covers the BERT pattern generator 16 through the control logic block 28 to the framer block 30 onto the LIU blocks 30, through the transmission lines 14. Alternatively, other apparatus in the test path may be similarly tested.

To perform BERT, certain number of parameters needs to be specified. For example, a parameter may include the test pattern type generated by the BERT pattern generator 16 as being either a pseudorandom or repetitive type. Another pattern may be the test failure threshold for determining whether or not BERT was successful indicating that the quality of transmission is acceptable. Yet another parameter may be error injection, which refers to the bit errors intentionally inserted by the user into the test pattern. A last pattern may include the duration of the test, which is the number of user-specified minutes of the test time.

The above-specified parameters are included in a profile, which is a group of test parameters defining the characteristics of the test that is to be run, such as the parameters discussed above. This will be more clearly explained later.

There are standards for defining the length of pseudorandom patterns, which have been adopted by the industry at large. The pattern length refers to the number of bits after which the pattern is repeated. For example, according to the CCITT/ITU standards, a 0.151 standard may include three different test pattern lengths. This is shown in FIG. 3 wherein various different test pattern types are shown to comprise of different pattern lengths. For example, the particular standard 0.151 defines the pattern lengths $2^{15}-1$, $2^{20}-1$ and $2^{23}-1$.

FIG. 4 shows examples of repetitive test patterns that may be employed for testing of the system 10 (in FIGS. 1 and 2) and used in the form of profiles. There is a direct correlation between the length of the pattern and test reliability in that the greater the length of the pattern, the more reliable the outcome of the test. Additionally, there is a correlation between the duration of the test and reliability thereof.

To run BERT on a transmission line, the test parameters stated above: the test pattern type; the test failure threshold; the error injection; and the duration of the test, are generally specified by a user. For example, if there are 20 lines from the telco switch 18 for each of those lines, the user specifies these parameters.

Thus, in an embodiment of the present invention, the different parameters are caused to be combined into a user-defined profile and given a particular profile number. Once defined, this profile remains in nonvolatile memory (such NVRAM) until erased. In the preferred embodiment shown in FIG. 2, the profiles may be maintained by the testing equipment.

To run BERT, two values are required; one value is the profile number and the other value is the transmission line number on which BERT is to be performed. In fact, a range of profiles may be defined by the user and is accordingly user-programmable. The transmission lines on which BERT is to be run is similarly programmable by the user.

The different profiles, which are assigned particular parameters are identified by a value or number and subsequently retrieved for testing purposed using the value assigned to them. Furthermore, multiple profiles may be used to test a transmission line (such as the transmission lines 14 (in FIGS. 1 and 2) automatically without any user intervention. For example, profiles having numbers ranging from 1 to 20 may be automatically generated for testing of a particular transmission line. Each of these profiles, in turn, has associated therewith particular parameters, which are preassigned by the user.

Accordingly, with the use of profiles, there is no need to provide different parameters every time a test is performed and the user is able to conduct testing of a transmission line using different test patterns automatically. Hence, using multiple profiles, allows the user to run BERT on multiple controllers without having to wait for a single test to be completed prior to starting testing of the line using a different test criteria. This minimizes user interaction, which in turn, substantially improves the speed of testing. Moreover, if transmission lines are being tested, the lines may be tested simultaneously using various profiles, which additionally, reduces testing time.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What we claim is:

1. A method for performing Bit Error Rate Testing (BERT) on a digital system employed, the digital system including a test equipment coupled to at least one transmission line for transferring digital information between the test equipment and a company office, the method comprising:

providing a bit error generator coupled to the transmission lines for generating test patterns;

storing a plurality of predetermined profiles, each profile having associated therewith at least one parameter for measuring the integrity of the test equipment or the transmission lines, said at least one of the parameters including one of the generated test patterns;

sending the predetermined profiles through the test equipment and the transmission lines automatically in a predetermined order thereby avoiding user interaction; and receiving information responsive to the profiles through the transmission line, wherein the received information is verified against the information included in the profiles for determining the integrity of the test equipment or the transmission lines.

2. A method for performing Bit Error Rate Testing (BERT) as recited in claim 1 wherein said profiles further include an error threshold parameter for setting the tolerance beyond which errors in the test equipment or transmission lines being tested are unacceptable.

3. A method for performing Bit Error Rate Testing (BERT) as recited in claim 1 wherein said profiles further include a test duration parameter for setting the time by which the BERT will be completed.

4. A method for performing Bit Error Rate Testing (BERT) as recited in claim 1 wherein said profiles are automatically provided to each of the transmission lines, the lines being tested together without awaiting completion of testing of a line prior to starting testing of another line.

5. A method for performing Bit Error Rate Testing (BERT) as recited in claim 1 wherein during said storing step, said profiles are stored in a RAM.

6. A method for performing Bit Error Rate Testing (BERT) as recited in claim 1 wherein said profiles are individual alterable by the user thereby providing customization of the BERT to fit the various characteristics of the test equipment or transmission lines undergoing testing.

7. A method for performing Bit Error Rate Testing (BERT) as recited in claim 1 wherein said method is employed by an Internet Service Provider (ISP).

8. A digital system for performing Bit Error Rate Testing (BERT) comprising:

a test equipment coupled to at least one transmission line for transferring digital information between the test equipment and a company office;

a bit error generator coupled to the transmission lines for generating test patterns;

a device for storing a plurality of predetermined profiles, each profile having associated therewith at least one parameter for measuring the integrity of the test equipment or the transmission lines, said at least one of the parameters including one of the generated test patterns, the predetermined profiles being automatically sent through the test equipment and the transmission lines in a predetermined order thereby avoiding user interaction, said test equipment for receiving information responsive to the profiles sent through the transmission line, wherein the received information is verified against the information included in the profiles for determining the integrity of the test equipment or the transmission lines.

9. A digital system as recited in claim 8 wherein said profiles further include an error threshold parameter for setting the tolerance beyond which errors in the test equipment or transmission lines being tested are unacceptable.

10. A digital system as recited in claim 8 wherein said profiles further include a test duration parameter for setting the time by which the BERT will be completed.

11. A digital system as recited in claim 8 wherein said profiles are automatically provided to each of the transmission lines, the lines being tested together without awaiting completion of testing of a line prior to starting testing of another line.

12. A digital system as recited in claim 8 wherein during said storing step, said profiles are stored in a RAM.

* * * * *